US012703896B2

(12) United States Patent
Kivelä et al.

(10) Patent No.: US 12,703,896 B2
(45) Date of Patent: Aug. 11, 2026

(54) PROCESS FOR RECOVERING AND PURIFYING LITHIUM

(71) Applicant: Fortum Battery Recycling Oy, Harjavalta (FI)

(72) Inventors: Paula Kivelä, Espoo (FI); Peik Ekman, Espoo (FI); Pasi Kauppinen, Espoo (FI); Kenneth Ekman, Espoo (FI); Ville Yrjänä, Espoo (FI)

(73) Assignee: Fortum Battery Recycling Oy, Harjavalta (FI)

( * ) Notice: Subject to any disclaimer, the term of this patent is extended or adjusted under 35 U.S.C. 154(b) by 414 days.

(21) Appl. No.: 18/036,232

(22) PCT Filed: Nov. 9, 2021

(86) PCT No.: PCT/FI2021/050758

§ 371 (c)(1),
(2) Date: May 10, 2023

(87) PCT Pub. No.: WO2022/101549

PCT Pub. Date: May 19, 2022

(65) Prior Publication Data

US 2023/0399720 A1 Dec. 14, 2023

(30) Foreign Application Priority Data

Nov. 10, 2020 (EP) .................................... 20206690

(51) Int. Cl.
*C22B 26/12* (2006.01)
*C01D 1/04* (2006.01)
(Continued)

(52) U.S. Cl.
CPC ................ *C22B 26/12* (2013.01); *C01D 1/04* (2013.01); *C01D 1/32* (2013.01); *C22B 3/24* (2013.01);
(Continued)

(58) Field of Classification Search
CPC .... C01D 1/04; C01D 1/32; C22B 3/24; C22B 3/42; C22B 26/12; Y02W 30/84; Y02P 10/20
See application file for complete search history.

(56) References Cited

U.S. PATENT DOCUMENTS 2,471,818 A * 5/1949 Hunter .................. C08F 222/08
525/327.8
2,980,497 A * 4/1961 Goodenough ............ C22B 3/42
423/641
(Continued)

FOREIGN PATENT DOCUMENTS

CN 110527836 A 12/2019
JP 2009270189 A * 11/2009
(Continued)

OTHER PUBLICATIONS

JP 2020012153 A Machine translation (Year: 2020).*
(Continued)

*Primary Examiner* — Tima M. McGuthry-Banks
(74) *Attorney, Agent, or Firm* — Thomas Ohman; Laine IP Oy

(57) ABSTRACT

The present invention relates to the recovery and purification of lithium from lithium containing sources, like lithium ion battery materials, using ion exchange. A lithium salt containing solution is passed through an acid cation exchange resin, and a lithium raffinate and a mixture of other elements such as metals like nickel, cobalt and manganese, are
(Continued)

recovered as products. The lithium raffinate can then be processed into other lithium products such as lithium carbonate and lithium hydroxide.

17 Claims, 4 Drawing Sheets

(51) Int. Cl.

| | |
|---|---|
| ***C01D 1/32*** | (2006.01) |
| ***C22B 3/24*** | (2006.01) |
| ***C22B 3/42*** | (2006.01) |

(52) U.S. Cl.

CPC ................. *C22B 3/42* (2013.01); *Y02P 10/20* (2015.11); *Y02W 30/84* (2015.05)

(56) References Cited

U.S. PATENT DOCUMENTS

| | | | | | |
|---|---|---|---|---|---|
| 2,980,499 | A | * | 4/1961 | Goodenough | C22B 26/12<br>423/181 |
| 3,295,920 | A | * | 1/1967 | Goodenough | C22B 26/12<br>423/181 |
| 3,459,500 | A | * | 8/1969 | Hunter | C01B 33/32<br>521/26 |

FOREIGN PATENT DOCUMENTS

| | | | | |
|---|---|---|---|---|
| JP | 2019125464 | A | | 7/2019 |
| JP | 2020012153 | A | * | 1/2020 |
| WO | WO20144018422 | A1 | | 1/2014 |
| WO | WO2018170721 | A1 | | 9/2018 |
| WO | WO2019160982 | A1 | | 8/2019 |

OTHER PUBLICATIONS

Xu, T. Regeneration of the lon-Exchange Resin. In: Drioli, E., Giorno, L. (eds) Encyclopedia of Membranes. Springer, Berlin, Heidelberg. https://doi.org/10.1007/978-3-642-40872-4_1422-3 (Year: 2014).*

JP 2009-270189 A machine translation (Year: 2009).*

Li: Study on the adsorption and desorption performance of iminodiacetic acid chelating resin D402 for low concentration Ni2+. China Master's Degree Thesis Full Text, Database Engineering Technology, May 1, 2015, vol. 1, No. 1, pp. 6-15, 65 & 66.

Li et al: Membrane-based technologies for lithium recovery from water lithium resources: A review. Journal of Membrane Science, Jul. 30, 2019, vol. 591.

* cited by examiner

PROCESS FOR RECOVERING AND PURIFYING LITHIUM

FIELD OF THE INVENTION

The present invention relates to the recovery and purification of lithium from lithium containing sources, like lithium ion battery materials.

BACKGROUND OF THE INVENTION

As both customer demand and technology readiness for electric appliances and vehicles increase, lithium ion batteries (LIBs) are becoming more important to fill the role for mobile energy storage. While invented in 1985, recent developments to increase energy density and production costs have seen a large increase in demand for LIBs. The current most common LIB types for electric mobility are based on NCM (nickel, cobalt and manganese) or NCA (nickel, cobalt, aluminium) as cathode materials and graphite as anode material. Even though effective, the current price for virgin materials make these technologies quite expensive to deploy while also causing significant GHG emissions during mining and processing to battery grade chemicals.

In recent years, there has been a significant uptick in efforts to mitigate the prices and emissions caused by LIB production by recycling end-of-life batteries. Routes for recycling are several, including pyro- and hydrometallurgical routes for metal recovery and separation. Currently, the majority of the batteries that are recycled are introduced in existing pyrometallurgical facilities such as smelters. Hydrometallurgical routes, or combinations of routes, are currently being built and tested around the world, and reductive roasting followed by leaching of lithium is emerging as a technology for recovery of lithium. This technology is a first-step lithium recovery method requiring high temperatures (>500° C.) and expensive reducing agents (e.g. hydrogen or coal) which increase the $CO_2$ footprint of the process significantly.

The primary lithium production is concentrated to South America, where lithium-rich brine is pumped into massive evaporation pools where it is concentrated by solar evaporation. This process takes up to two years. The lithium concentrate is then processed into lithium carbonate, and then eventually turned into lithium hydroxide by a conversion reaction with lime and crystallized by evaporation. The emergence of low-cobalt cathode materials favor hydroxide as lithium source, which is more readily processed from solid ore.

A novel method for recovering and purifying lithium from lithium containing sources has been invented. The method according to the present invention is a one-step purification and separation route in which a lithium containing solution is purified using chromatographic separation. The method can be used to recover and purify any lithium containing solution such as process liquors from LIB recycling or primary lithium production. In comparison to currently known processes, the described method according to the present invention is low-emission, simple and produces a high-purity lithium intermediate that can be used in battery grade lithium production.

SUMMARY OF THE INVENTION

The present invention relates to the recovery and purification of lithium from lithium containing sources, like lithium ion battery materials, using ion exchange. A lithium salt containing solution is passed through an acid cation exchange resin, and a lithium raffinate and a mixture of other elements such as metals like nickel, cobalt and manganese, are recovered as products. The lithium raffinate can then be processed into other lithium products such as lithium carbonate and lithium hydroxide.

More precisely the present inventions relates to a method for recovering and purifying lithium from a lithium containing material comprising the steps of, passing a process solution containing lithium salt and other elements through an acid cation exchange resin; collecting a lithium raffinate; optionally flushing out residual lithium as lithium hydroxide with a monoprotic hydroxide; eluting the other elements from the acid cation exchange resin with a strong acid solution to obtain an eluate and regenerating the acid cation exchange resin with a monoprotic hydroxide solution.

According to one embodiment of the invention the lithium containing material is a lithium ion battery material.

According to another embodiment of the invention the lithium salt is a lithium sulphate.

According to still another embodiment of the present invention the process solution has a pH of 3-5.5.

According to a further embodiment of the invention the monoprotic hydroxide is sodium hydroxide.

According to still a further embodiment of the invention sulphuric acid is used as the strong acid in the acid solution.

According to one embodiment of the invention the acid cation exchange resin is a weak acid cation having carboxylic acids as a functional group.

According to still another embodiment of the invention the process solution is passed through at a rate of 0.5-6 BVs/h.

DEFINITIONS

Figure 1:
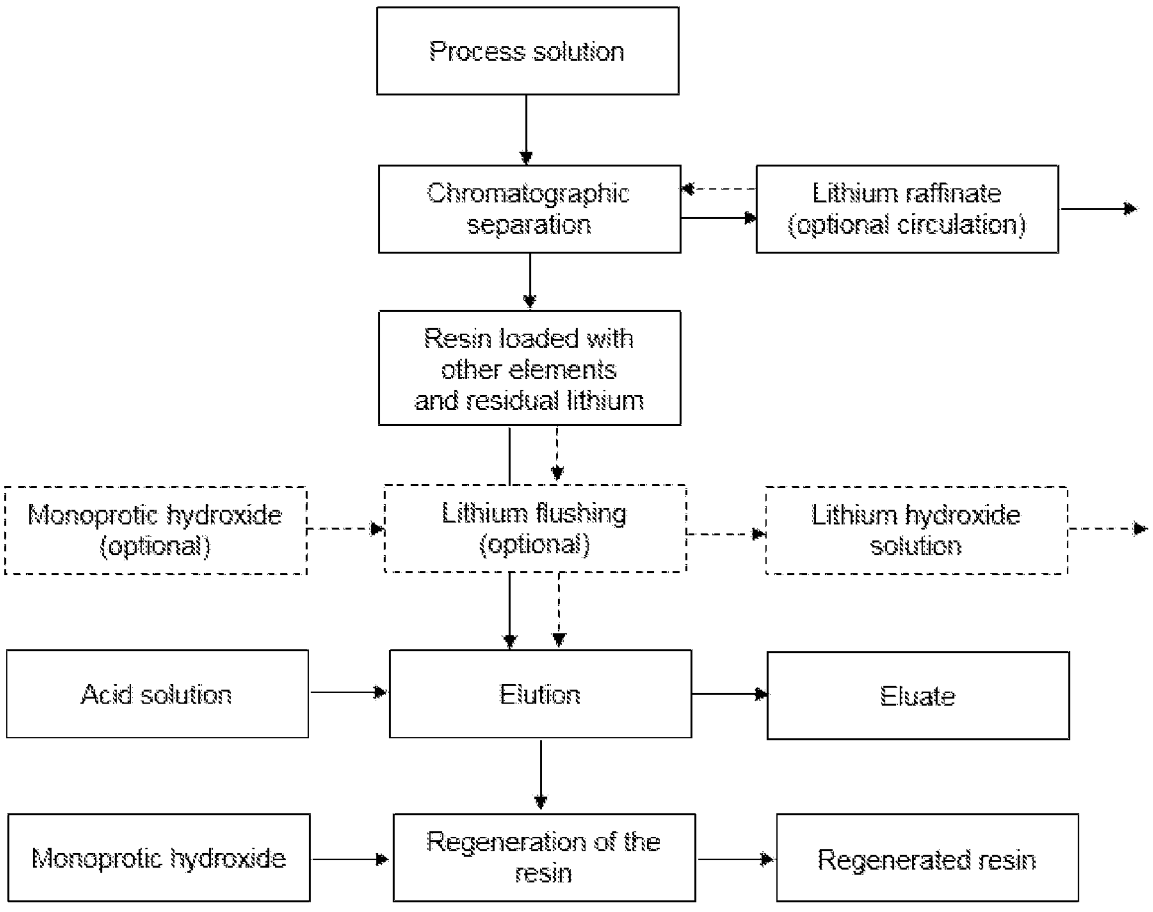
FIG. 1. A schematic flow chart of the method according to the present invention.

Black mass, a mixture of cathode and anode active materials, separated from battery components BV or BVs mean bed volume or bed volumes; the volume of a resin bed when packed into a column DC means dry content ICP-MS means Inductively Coupled Plasma Mass Spectrometer LIB, lithium ion battery MP-AES means Microwave Plasma Atomic Emission Spectrometer NCA, a type of cathode material based on nickel, cobalt and aluminium NCM, a type of cathode material based on nickel, cobalt and manganese WAC, weak acid cation SAC, strong acid cation

DETAILED DESCRIPTION OF THE INVENTION

The present invention relates to the recovery and purification of lithium from lithium containing sources. The raw material i.e. the lithium containing source can be e.g. lithium ion battery (LIB) material or any other lithium containing source such as off-specification material or by-product from primary lithium production.

In primary lithium production from both brine and ore, common impurities present are calcium, magnesium and potassium that can be processed by different hydrometallurgical methods. In the lithium carbonate conversion reaction, calcium hydroxide is used as hydroxide source. These elements are difficult to prevent from co-precipitation during lithium precipitation or crystallization and thus some amount of the lithium products are considered unusable for battery materials. Lithium content in these materials is highly variable and for the process, according to the present invention, are pre-treated with sulfuric acid, hydrochloric acid or other applicable acids to transform them into lithium salt containing solutions. Any potential insoluble impurities are filtered.

Typically, lithium content in any battery material directly relates to the amount of other cathode elements present in the material, such as nickel, cobalt, manganese (NCM-based) or aluminium (NCA-based). Black mass is expected to contain 3-4 wt % lithium. In a typical LIB recycling hydrometallurgical process, this black mass is subjected to a leaching step to dissolve the soluble elements after which the insoluble materials (e.g. graphite) can be separated by filtration. The resulting filtrate is expected to contain 2.5-4.5 g/l of lithium, but the lithium content may also be higher depending on the black mass or the leaching step parameters.

The term "process solution" as used in the context of the present invention means a lithium salt containing solution with a pH of 3-5.5, preferably 4-4.5. The adjustment of pH of the lithium salt containing solution, if needed, can be done with a monoprotic hydroxide or with the acid already present in the mentioned solution.

Filtrate obtained from the filtration step of the above described leaching process presents a typical lithium salt containing solution. The metal composition of that solution will vary depending on the raw material, e.g. cathode elements present or impurities present, and may contain both aluminium and manganese as well as other elements, such as iron, magnesium and calcium, depending on the source material.

The recovery and purification process according to the present invention is now described in detail referring to the schematic flow chart of FIG. 1.

In the chromatographic separation, which is the first step of the recovery and purification process according to the present invention, the process solution containing lithium salt and other elements, like nickel, cobalt and manganese, depending on the elements present in the raw material, with a pH of 3-5.5, preferably 4-4.5, is passed through an acid cation exchange resin bed, such as carboxylic or sulfonic acid resin bed, at a rate of 0.5-6 BVs/h, preferably 2-4 BVs/h. Collection of lithium raffinate starts at 0-1 BVs, preferably at 0.5-1 BVs while other elements are retained in the resin until operating capacity is reached. The operating capacity can be predetermined by calculating the resin capacity from the element content of the initial feed. On the other hand, the operating capacity can be detected on-line by visual inspection or with spectroscopic methods such as by UV or other methods known by person skilled in the art. For a typical process solution containing 20-30 g/l of elements (i.e. lithium and other elements in total), the lithium raffinate is collected at 0-3 BVs, preferably 0.5-2 BVs. Temperature during chromatographic separation can be 20-100° C., preferably 25-50° C. and intra-column pressure can be from ambient up to 10 bar, preferably between 1-5 bar.

Lithium raffinate comprises lithium salt and a monoprotic salt that is a result of the chromatographic separation. As an optional step, the lithium raffinate can be circulated through the resin bed several times to further increase purity and concentration of lithium in the lithium raffinate. The resulting lithium raffinate can then be processed to lithium products such as lithium carbonate or lithium hydroxide using known hydrometallurgical methods.

Optionally, aqueous monoprotic hydroxide e.g. sodium hydroxide is used to flush out residual lithium from the columns i.e. from the resin loaded with other elements and residual lithium, producing a lithium hydroxide solution. The concentration of the monoprotic hydroxide used in this step is 0.25-2 wt %, preferably 0.5-1 wt %.

One further step (not shown in FIG. 1), also optional, is to add monoprotic hydroxide solution to the lithium raffinate and use that hydroxide-raffinate solution for flushing to increase purity and concentration of lithium of the lithium raffinate. The solution leaving the column after flushing contains lithium salt, lithium hydroxide and a monoprotic salt that is a result of the chromatographic separation.

In the second step, the other elements are eluted from the resin with 1-4 BVs of a strong acid solution like 10-25 wt %, preferably 15-20 wt % sulphuric acid or hydrochloric acid solution. Also other applicable strong acids can be used with the similar concentration. The resulting eluate contains e.g. nickel, cobalt, manganese and/or aluminium in a form of salts e.g., sulfates or chlorides depending on the strong acid used. The acid solution is fed at a rate of 1-6 BVs/h, preferably 2-4 BVs/h.

The eluate can then be processed into separate products with traditional hydrometallurgical methods such as solvent exchange, precipitation and ion exchange.

The resin bed is washed with 0.5-2 BVs, preferably 1-1.5 BVs, of water to remove residual eluate.

In the final step, the resin is regenerated using a 2-25 wt %, preferably 5-20 wt %, monoprotic hydroxide like sodium or lithium hydroxide solution, which is fed through the resin bed at a rate of 1-6 BVs/h, preferably 2-4 BVs/h. After this step, the resin bed is ready for repeated use.

The number of columns in series can be 1-10, preferably 2-6. Other techniques, such as simulated moving bed, can also be applied for this invention.

EXAMPLES

In the examples 1-8 below, black mass containing NCM based cathode material was dissolved in sulfuric acid using hydrogen peroxide as a reducing agent to obtain a lithium salt containing solution. The metal composition is presented in Table 1.

TABLE 1

Metal composition of the lithium salt containing solution.

| Element | mg/kg |
|---|---|
| Co | 10 200 |
| Li | 2 550 |
| Mn | 1 480 |
| Ni | 8 850 |

Example 1

Figure 2:
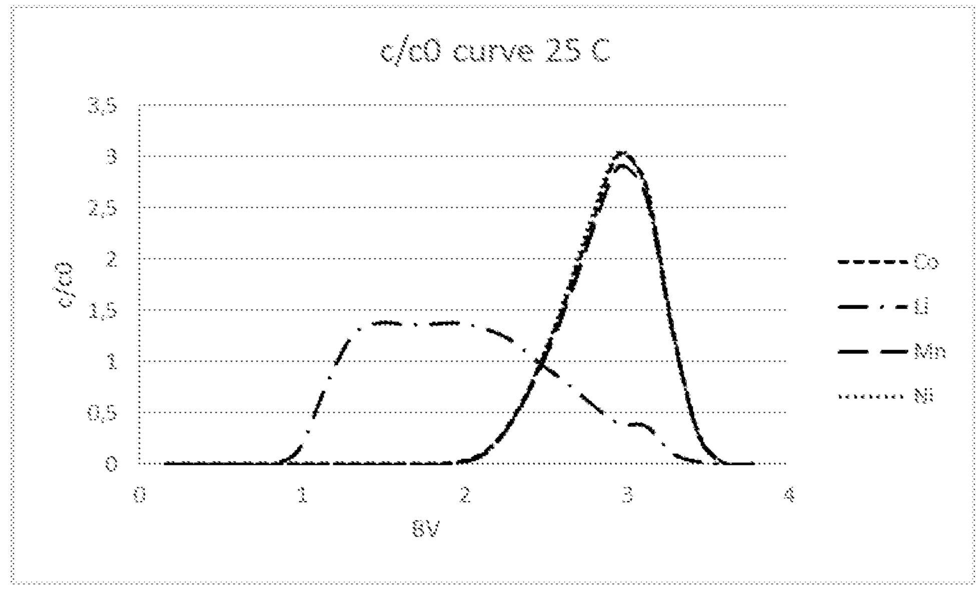
FIG. 2. Relative concentration curves of elements in Example 1.

40 ml of Finex CA16G-Na resin with carboxylic acid functionality was loaded into a 25 mm diameter chromatographic column (YMC Eco). Bed height measured to 575 mm. pH of the lithium salt containing solution was adjusted to 3.5 with sodium hydroxide (NaOH) to obtain a process solution. 700 ml of the process solution was pumped at a rate of 1 BVs/h through the resin bed and then immediately followed by 500 ml of 20% sulfuric acid ($H_2SO_4$) and then followed by water until clear solution was collected. Samples were collected at 50 ml intervals. Samples were analysed with MP-AES for metal content, and were presented as relative concentration curve (sample concentration (c) vs. original concentration ($c_0$) in the process solution). The curves are shown in FIG. 2.

A clear chromatographic separation of lithium is observed as lithium concentration increases to about 1.5× the original. In the area of 0.8 BV to 2 BVs, 80% of lithium is separated from other elements.

Example 2

40 ml of Finex CA16G-Na resin with carboxylic acid functionality was loaded into a 30 mm diameter column. Bed height was measured to 80 mm. pH of the lithium containing solution (containing dissolved battery material) was increased to pH 4 with sodium hydroxide. 38 ml of the pH-adjusted process solution was circulated through the resin bed for 3 hours at a rate of 3 BVs/h. The lithium raffinate was collected, the resin bed was washed with 2 BVs of water, and then eluted with 1.5 BVs of 20 wt % sulfuric acid ($H_2SO_4$). The samples were analysed with MP-AES (Agilent Technologies) for metal contents and yields were calculated and are presented in Table 2.

TABLE 2

Metal yields of the solutions in Example 2.

| Sample | Co | Li | Mn | Ni |
|---|---|---|---|---|
| Lithium raffinate | 0% | 60% | 0% | 0% |
| Eluate | 100% | 40% | 99% | 100% |
| Total | 100% | 100% | 99% | 100% |

Chromatographic separation of lithium is clearly demonstrated, which allows recovery of at least 60% of the lithium present in the leach, lithium salt containing, solution.

Example 3

40 ml of Finex CA16G-Na resin with carboxylic acid functionality was loaded into a 30 mm diameter column. Bed height was measured to 80 mm. pH of the leach solution i.e. the lithium salt containing solution was increased to 3.1 with NaOH, and 41 ml of this process solution was passed through the resin bed at a rate of 3 BV/h. The lithium raffinate was collected and analysed with MP-AES.

The resin bed was washed with 2 bed volumes of water, after which the resin bed was flushed with 1 BV of 20 wt % NaOH solution. The flushing solution was collected and analysed with MP-AES. Finally, the resin was eluted with 1.5 BVs of 20 wt % $H_2SO_4$ which was collected and analysed with MP-AES. Metals yields were calculated in all samples and are presented in Table 3.

TABLE 3

Metal yields of the solutions in Example 3.

| Sample | Co | Li | Ni |
|---|---|---|---|
| Lithium raffinate | 0% | 16% | 0% |
| Lithium hydroxide solution | 0% | 84% | 0% |
| Eluate | 100% | 0% | 100% |
| Total | 100% | 100% | 100% |

Example 4

40 ml of Finex CA16G-Na resin with carboxylic acid functionality was loaded into a 30 mm diameter column. Bed height was measured to 80 mm. pH of a lithium salt containing solution was increased to 3 with NaOH, and 50 ml of the process solution was passed through the resin bed at a rate of 3 BV/h. The lithium raffinate was collected and analysed with MP-AES.

The resin bed was washed with 2 bed volumes of water, after which the resin bed was flushed with 1 BV of 5 wt % NaOH solution. The flushing solution was collected and analysed with MP-AES. Lastly, the resin was eluted with 1.5 BVs of 20 wt % $H_2SO_4$ and eluate was collected and analysed with MP-AES.

Metals yields were calculated in all samples and are presented in Table 4.

TABLE 4

Metal yields of the solutions in Example 4.

| Sample | Co | Li | Ni |
|---|---|---|---|
| Lithium raffinate | 0% | 36% | 0% |
| Lithium hydroxide solution | 0% | 65% | 0% |
| Eluate | 79% | 0% | 100% |
| Total | 79% | 99% | 100% |

Example 5

Three columns were each packed with 4300 ml of Finex CA16G-Na resin. pH of the leach solution was adjusted to 4.4 with NaOH. The process solution was pumped through the columns in series at a rate of 1.6 BVs/h, and samples were taken at 1 liter intervals after each column. All samples were analysed with MP-AES.

161 g of NaOH was dissolved in 201 of lithium raffinate and the columns were flushed at a rate of 1.6 BVs/h using this mixture (optional step, not shown in FIG. 1). Samples were taken at 1 liter intervals and analysed with MP-AES. As the last step, the columns were eluted with 1.5 BVs of 20 wt % $H_2SO_4$ at a rate of 4 BV/h. The results are presented in Table 5.

TABLE 5

Metal yields of solutions in Example 5.

| | Co | Li | Mn | Ni |
|---|---|---|---|---|
| 1. column | | | | |
| Lithium raffinate | 36% | 68% | 37% | 34% |
| Lithium hydroxide solution | 2% | 19% | 2% | 1% |
| Eluate | 53% | 9% | 45% | 51% |
| 2. column | | | | |
| Lithium raffinate | 3% | 43% | 3% | 3% |
| Lithium hydroxide solution | 0% | 36% | 1% | 1% |
| Eluate | 36% | 9% | 38% | 33% |
| 3. column | | | | |
| Lithium raffinate | 0% | 16% | 0% | 0% |
| Lithium hydroxide solution | 0% | 44% | 0% | 0% |
| Eluate | 5% | 18% | 7% | 4% |

Example 6

Figure 3:
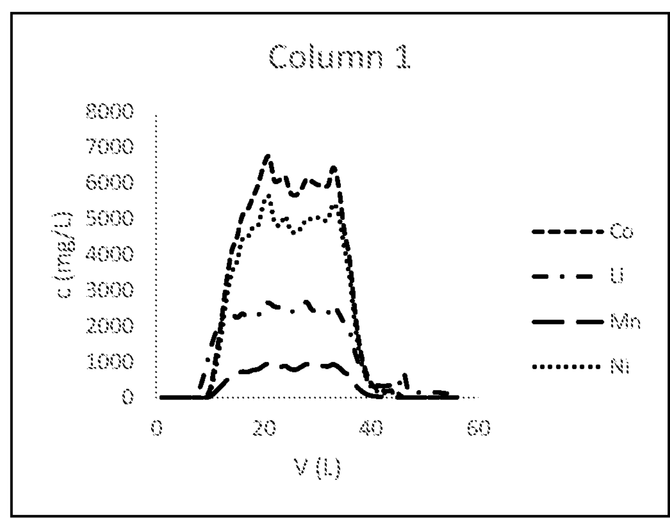
FIG. 3. Breakthrough curves of columns 1, 2 and 3 in Example 6.
Figure 3:
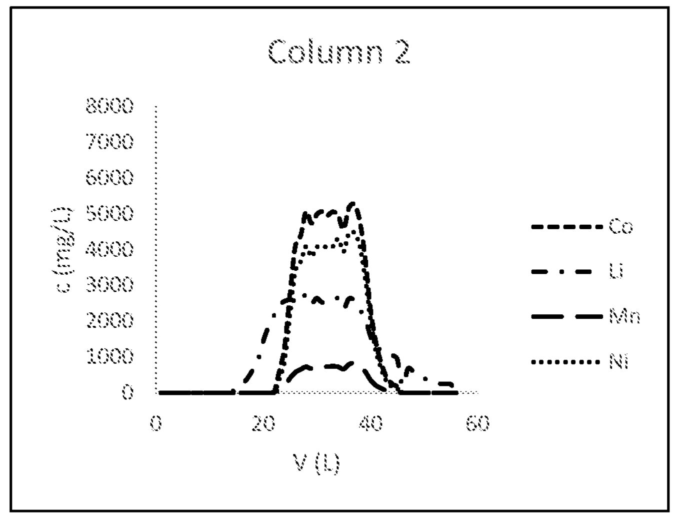
Figure 3:
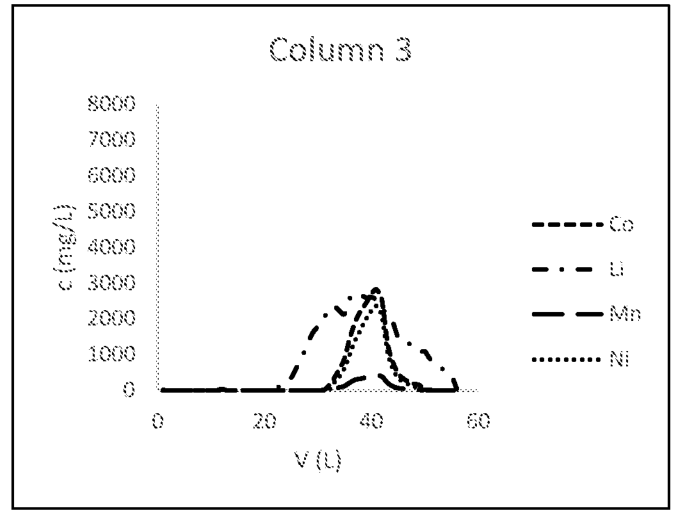

Three columns were packed each with 4300 ml of Finex CA16G-Na resin and pH of the dissolved black mass was increased to 4 with NaOH. The process solution was pumped through the columns in series at a rate of 2 BV/h, and samples were taken at 1 liter intervals after each column. All samples were analysed with MP-AES. Columns were washed with 1 BV of water and as the last step, the columns were eluted with 1.5 BVs of 20 wt % $H_2SO_4$. Breakthrough curves are shown in FIG. 3.

The chromatographic effect is evident when the column length increases, as lithium is moving faster through the columns and breaking through earlier than nickel, cobalt and manganese. Consequently, this allows for collection lithium fraction free from other metals.

Example 7

Figure 4:
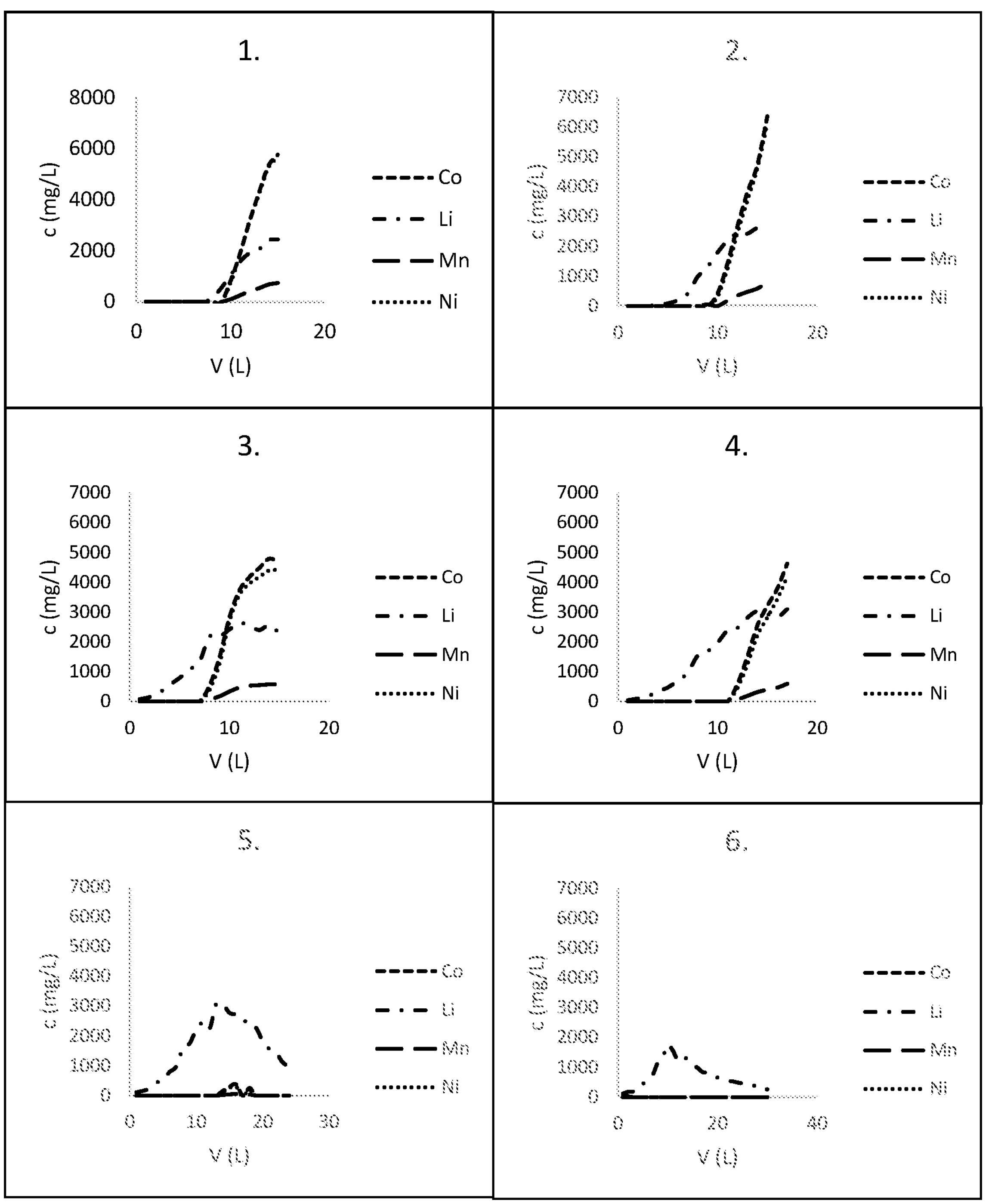
FIG. 4. Breakthrough curves of columns 1-6 in Example 7.

Six columns were packed each with 4300 ml of Finex CA16G-Na resin and pH of lithium salt containing solution was increased to 4 with NaOH. The process solution was pumped through the columns in series at a rate of 4 BV/h, and samples were taken at 1 liter intervals after each column. All samples were analyzed with MP-AES. Columns were washed with 1 BV of water and as the last step, the columns were eluted with 1.5 BVs of 20 wt % $H_2SO_4$. Breakthrough curves are shown in FIG. 4.

Based on these results, it can be concluded that the other elements, e.g. nickel, cobalt and manganese bind harder to the resin allowing lithium to exit the column earlier resulting in lithium fraction free from other metals coming at the end of the last column.

Example 8

A black mass containing NCM cathode material was dissolved in hydrochloric acid and filtered. Filtrate pH was increased to 4.2 with NaOH to create a process solution. 50 ml process solution was passed through 40 ml of Finex CA16G-Na resin at a rate of 2 BVs/h. 50 ml of lithium raffinate was collected and resin was eluted with 1 BV of 10% HCl.

TABLE 6

Metal yields of the solutions in Example 8.

| Sample | Co | Li | Mn | Ni |
|---|---|---|---|---|
| Raffinate | 15% | 75% | 16% | 15% |
| Eluate | 75% | 21% | 75% | 76% |
| Total | 90% | 95% | 91% | 90% |

The invention claimed is:

1. A method for recovering and purifying lithium from a lithium-containing solution comprising:

(a) passing the lithium-containing solution comprising a lithium salt and one or more other elements through an acid cation exchange resin, (b) collecting a lithium raffinate from the acid cation exchange resin while at least a portion of the one or more other elements are retained by the acid cation exchange resin, (c) flushing out residual lithium from the acid cation exchange resin as lithium hydroxide with a first monoprotic hydroxide solution to obtain further lithium, (d) eluting the other elements from the acid cation exchange resin with an acid solution to obtain an eluate, and (e) regenerating the acid cation exchange resin with a second monoprotic hydroxide solution.

2. The method of claim 1, further comprising repeating at least steps (a)-(b) two or more times.

3. The method of claim 1, further comprising repeating steps (a)-(e) two or more times.

4. The method of claim 1, wherein the lithium-containing solution comprises a lithium ion battery material or a byproduct from lithium production.

5. The method of claim 1, wherein the lithium salt is lithium sulphate.

6. The method of claim 1, wherein the lithium-containing solution has a pH of 3-5.5.

7. The method of claim 1, wherein the first monoprotic hydroxide solution and/or the second monoprotic hydroxide solution comprises sodium hydroxide.

8. The method of claim 1, wherein the acid solution comprises sulphuric acid.

9. The method of claim 1, wherein the acid solution comprises a 10-25 wt % sulphuric or hydrochloric acid solution.

10. The method of claim 1, wherein the acid cation exchange resin comprises carboxylic acid functional groups.

11. The method of claim 1, wherein the lithium-containing solution is passed through at a rate of 0.5-6 BVs/h.

12. The method of claim 1, wherein, in step (a), the lithium-containing solution is passed through the acid cation exchange resin at a rate of 0.5-6 BVs/h while the one or more other elements are retained in the acid cation exchange resin until operating capacity is reached.

13. The method of claim 1, wherein, in step (b), the lithium raffinate is collected at 0-1 BVs while the one or more other elements are retained in the acid cation exchange resin until operating capacity is reached.

14. The method according to claim 1, wherein the first monoprotic hydroxide solution comprises a monoprotic hydroxide concentration of 0.25-2 wt %.

15. The method according to claim 1, wherein the second monoprotic hydroxide solution comprises a monoprotic hydroxide concentration of 2-25 wt %.

16. The method of claim 1, further comprising washing the acid cation exchange resin with 0.5-2 BVs of water to remove residual eluate.

17. The method of claim 1, wherein the eluting of the other elements from the acid cation exchange resin is performed with 1-4 BVs of the acid solution, wherein the acid solution is fed at a rate of 1-6 BVs/h, and wherein the second monoprotic hydroxide solution is fed through the acid cation exchange resin at a rate of 1-6 BVs/h.

* * * * *